United States Patent
Ostrander

(10) Patent No.: US 9,764,753 B2
(45) Date of Patent: Sep. 19, 2017

(54) APPARATUS FOR REPOSITIONING A PIANO

(71) Applicant: Leonard Ostrander, Chagrin Falls, OH (US)

(72) Inventor: Leonard Ostrander, Chagrin Falls, OH (US)

(*) Notice: Subject to any disclaimer, the term of this patent is extended or adjusted under 35 U.S.C. 154(b) by 0 days.

(21) Appl. No.: 15/135,943

(22) Filed: Apr. 22, 2016

(65) Prior Publication Data
US 2016/0311671 A1    Oct. 27, 2016

Related U.S. Application Data

(60) Provisional application No. 62/153,024, filed on Apr. 27, 2015.

(51) Int. Cl.
*B62B 3/10*   (2006.01)
*B66F 7/06*   (2006.01)
*B66F 19/00*  (2006.01)

(52) U.S. Cl.
CPC .............. *B62B 3/10* (2013.01); *B66F 7/0625* (2013.01); *B66F 7/0641* (2013.01); *B66F 19/00* (2013.01); *B62B 2202/34* (2013.01)

(58) Field of Classification Search
CPC ............ B62B 2202/30; B62B 2202/34; B62B 3/04–3/0631; B62B 3/10; B62B 5/0083; B66F 2700/05; B66F 2700/055; B66F 2700/126; B66F 5/00; B66F 5/04; B66F 7/0641; B66F 7/0625; B66F 7/10; B66F 7/18; B66F 7/28; B66F 19/00
See application file for complete search history.

(56) References Cited

U.S. PATENT DOCUMENTS 1,584,250 A * 5/1926 Stephenson ............... B62B 3/04
                                                       254/3 R
2,732,034 A * 1/1956 Latimer .................. B66F 3/247
                                                       254/10 B
2,814,394 A * 11/1957 Witcher .................. B66C 23/48
                                                       254/124

(Continued)

FOREIGN PATENT DOCUMENTS

BR    MU9001280    12/2012
EP    0855330       7/1998

(Continued)

OTHER PUBLICATIONS

Pianodolly.com.
Student-movers—Turning a Piano onto It's Side.

*Primary Examiner* — Joseph J Hail
*Assistant Examiner* — Tyrone V Hall, Jr.
(74) *Attorney, Agent, or Firm* — Buckingham, Doolittle & Burroughs, LLC

(57) ABSTRACT

An apparatus for repositioning a piano between a horizontal orientation and a vertical orientation, and for moving the piano along a surface while in the vertical orientation. The apparatus comprises a base assembly, a cradle assembly, and a repositioning assembly. The base assembly provides a framework for connecting the cradle assembly to the repositioning assembly. The cradle assembly engages and supports the piano. The repositioning assembly moves the cradle assembly between a horizontal and a vertical position.

10 Claims, 7 Drawing Sheets

(56) References Cited

U.S. PATENT DOCUMENTS

| | | | | |
|---|---|---|---|---|
| 2,904,308 | A | * | 9/1959 | Vergara .................... B66F 19/00 254/124 |
| 2,908,403 | A | * | 10/1959 | Browder, Jr. ........ B25H 1/0007 269/151 |
| 3,059,785 | A | * | 10/1962 | Buckeye ................. B66C 23/48 212/261 |
| 3,958,793 | A | * | 5/1976 | Garate ...................... B66F 5/04 254/10 B |
| 4,084,706 | A | | 4/1978 | Russell |
| 4,122,958 | A | * | 10/1978 | Thayer ...................... B62B 3/10 254/3 R |
| 4,239,196 | A | * | 12/1980 | Hanger ................ B25H 1/0007 269/17 |
| 4,475,714 | A | | 10/1984 | Heiskell et al. |
| 4,479,632 | A | * | 10/1984 | McIntire ................. B66C 23/48 254/10 B |
| 4,548,387 | A | * | 10/1985 | Saccoccia ............. B66F 7/0625 254/10 B |
| 4,669,703 | A | * | 6/1987 | Hawkins ................. B66C 23/48 254/124 |
| 4,913,614 | A | | 4/1990 | O'Rarden |
| 5,358,217 | A | * | 10/1994 | Dach ......................... B66F 3/00 254/134 |
| 5,372,353 | A | * | 12/1994 | West .................... B25H 1/0007 254/10 B |
| 5,375,963 | A | * | 12/1994 | Wohlwend ............. B66C 23/48 212/203 |
| 5,387,074 | A | | 2/1995 | Brown |
| 5,448,945 | A | | 9/1995 | Taylor et al. |
| 5,575,609 | A | * | 11/1996 | Monkhorst ............... B62B 3/08 187/233 |
| 5,863,034 | A | * | 1/1999 | Vauter .................... B23K 37/04 269/17 |
| 5,885,048 | A | | 3/1999 | Barth |
| 6,010,299 | A | * | 1/2000 | Jesswein .................. B66F 5/00 254/8 R |
| 6,457,700 | B1 | * | 10/2002 | Hong ...................... B66C 23/48 254/124 |
| 6,485,247 | B1 | | 11/2002 | Groves et al. |
| 6,926,254 | B1 | * | 8/2005 | Nymann ............... B25H 1/0007 254/124 |
| 7,014,012 | B2 | | 3/2006 | Baker |
| 7,249,771 | B1 | * | 7/2007 | Brennan ............. A47J 37/0704 280/35 |
| 7,628,408 | B2 | | 12/2009 | Kolesa |
| 8,047,759 | B2 | * | 11/2011 | Ladd ...................... B66F 9/0655 414/685 |
| 8,348,287 | B1 | * | 1/2013 | Smith ...................... B62B 3/04 280/47.34 |
| 8,540,254 | B2 | | 9/2013 | Jensen |
| 2003/0007852 | A1 | * | 1/2003 | Bernards .................. B62B 3/10 414/460 |
| 2007/0131883 | A1 | | 6/2007 | Goodrich et al. |

FOREIGN PATENT DOCUMENTS

| | | |
|---|---|---|
| EP | 0863092 | 9/1998 |
| JP | 3097632 | 2/2004 |

* cited by examiner

APPARATUS FOR REPOSITIONING A PIANO

CROSS-REFERENCE

This application claims priority from Provisional Patent Application Ser. No. 62/153,024 filed Apr. 27, 2015.

FIELD OF THE INVENTION

This invention pertains generally to a piano moving apparatus, and more particularly to an apparatus comprising a frame component and a lifting component for tilting, repositioning and relocating a grand piano.

BACKGROUND

Moving a grand piano generally requires incorporating the physical strength of several people and a variety of dollies, straps, skids, and carts. During the traditional process of moving a grand piano, a person on the moving team typically must lift the left front portion of the piano up off of the ground so that a second person can remove the left front leg. After the left front leg is removed, the weight once held by that leg is shifted to the lyre or pedal mechanism of the piano. A skid board is then located along the left side of the piano at a position where the piano is expected to rest once tipped over onto that side. The left front side of the piano is then lowered by the piano movers to the skid board while simultaneously pivoting on the pedal lyre and rear leg. This movement exerts a tremendous side load on the pedal lyre and rear leg of the piano. Essentially the entire weight of the piano is shifted to these two points which are constructed of wood and are not necessarily designed to support such side loading when the piano is tilted. To compensate for the excessive side load, the movers must physically support the additional weight manually.

Once lowered so that the front left bottom corner comes into contact with the skid board, the weight of the piano is then distributed between the side, the rear leg, and the pedal lyre. Next, the piano is raised to rest on the lowered left side on the skid board by pivoting around the front left bottom corner of the piano and the rear leg. This essentially balances the piano on the left side between the lower left side and the rear leg. The piano is then pushed by the movers up to a vertical position on the skid board. The piano is continuously repositioned for balance as needed and secured to the skid board with straps. Once secured, the piano and skid board are physically lifted by the movers and rotated around the front corner of the skid board approximately 45 degrees. A moving dolly is then positioned under the piano and skid board which are then physically lowered on to the dolly for transport.

Consequently, there exists a need for a piano moving apparatus that allows for a grand piano to be moved without the need for people to physically lift, turn, reposition, or in any way come into contact with the instrument while it is being lifted, turned, and positioned onto a skid board and dolly. The present invention discloses an apparatus for repositioning a grand piano vertically from the horizontal and vice versa on a skid board upon a dolly without the need to manually lift the piano. This decreases the safety issues associated with the process of moving heavy objects by limiting the amount of strenuous physical activity needed to move a piano during the tear down and set up phases. The likelihood of physical damage to the piano itself is also reduced.

SUMMARY

The following presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises an apparatus for repositioning and moving a grand piano. The apparatus comprises a base assembly, a cradle assembly, and a repositioning assembly. The base assembly comprises a base frame that may function as a rolling dolly and a vertical frame extending substantially upward off of the base frame. The cradle assembly engages an underside of the piano. The repositioning assembly moveably connects the base assembly to the cradle assembly so that the cradle assembly may reposition the piano from a substantially horizontal orientation to a substantially vertical orientation or vice versa.

Furthermore, in a preferred embodiment of the invention the base frame comprises a plurality of castors so that the apparatus and piano may be easily rolled along a surface as a single unit. The repositioning assembly comprises a cylinder top beam positioning element, a cylinder top beam, and a torque tube element. The cylinder top beam positioning element moveably connects the vertical frame of the base assembly to the cradle assembly with the torque tube element. The cylinder top beam is attached to the cylinder top beam positioning element. The apparatus further comprises a piston that moveably connects the cylinder top beam and the base assembly. As the piston is extended, the repositioning element then moves the cradle assembly from the substantially horizontal orientation to the substantially vertical orientation.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
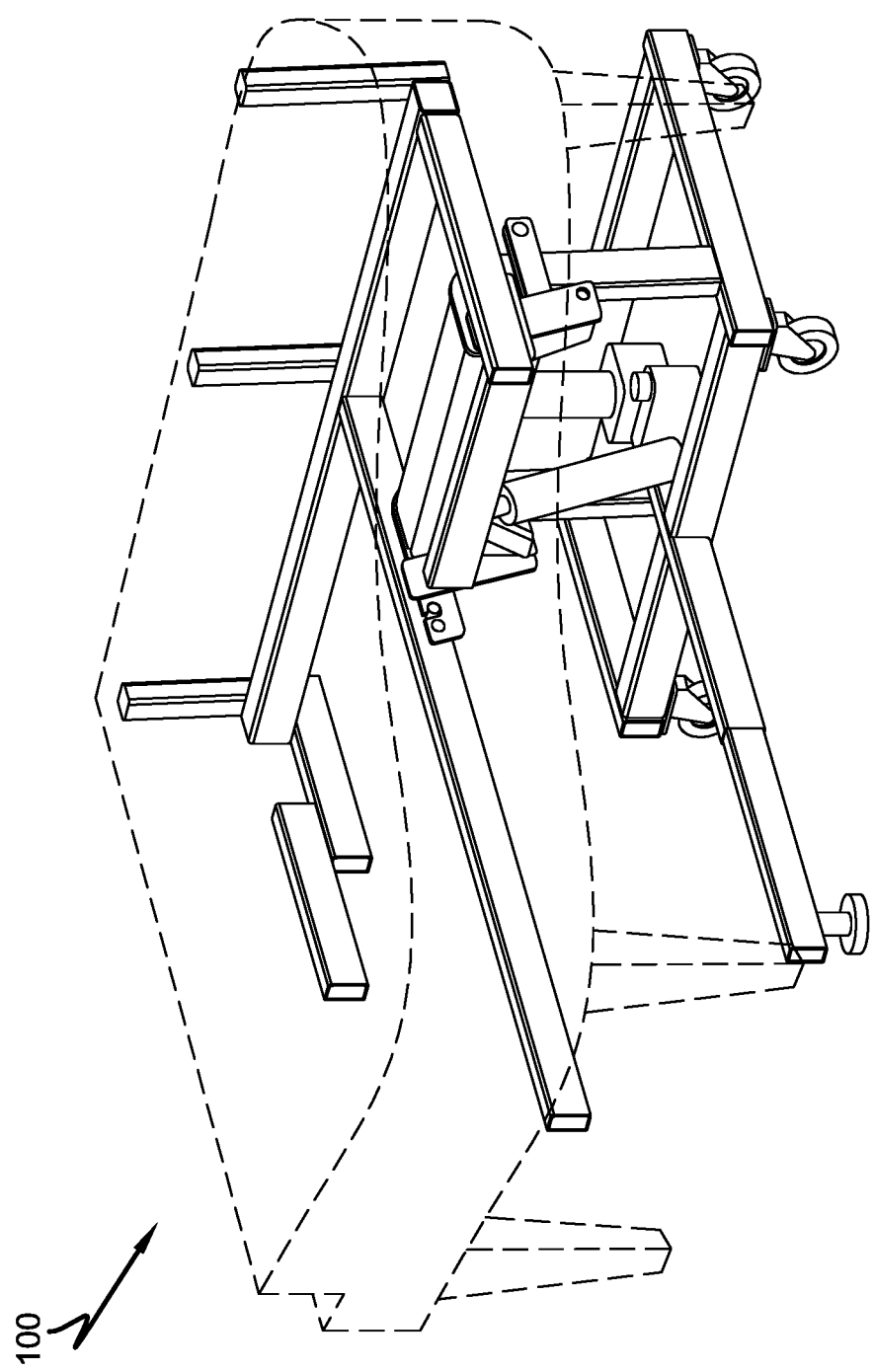
FIG. 1 illustrates a perspective view of an apparatus for repositioning a piano in accordance with the disclosed architecture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter. The invention relates generally to an apparatus for mechanically lifting, tilting, and repositioning a grand piano for transport.

Figure 2:
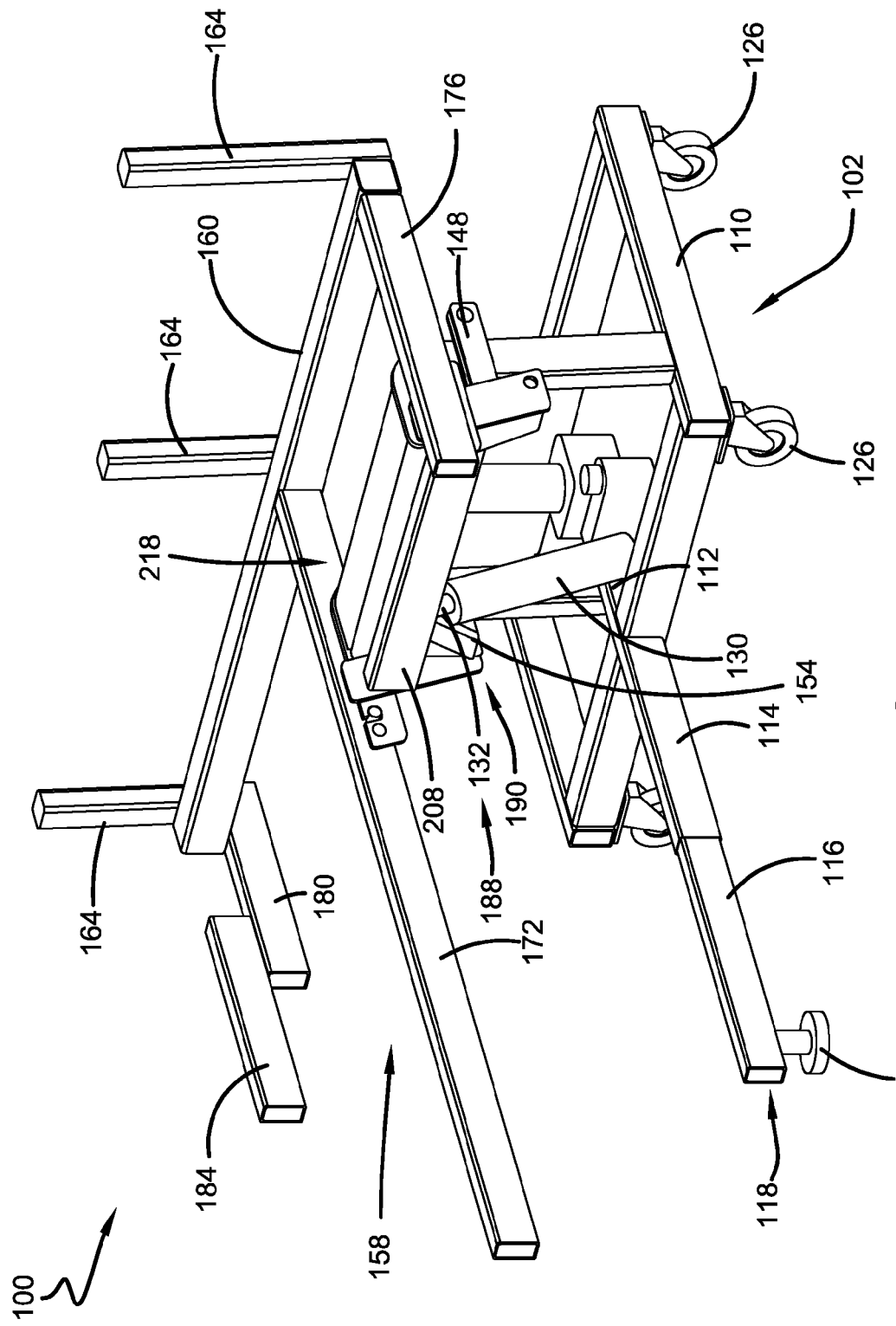
FIG. 2 illustrates a perspective view of the apparatus in accordance with the disclosed architecture.
Figure 3:
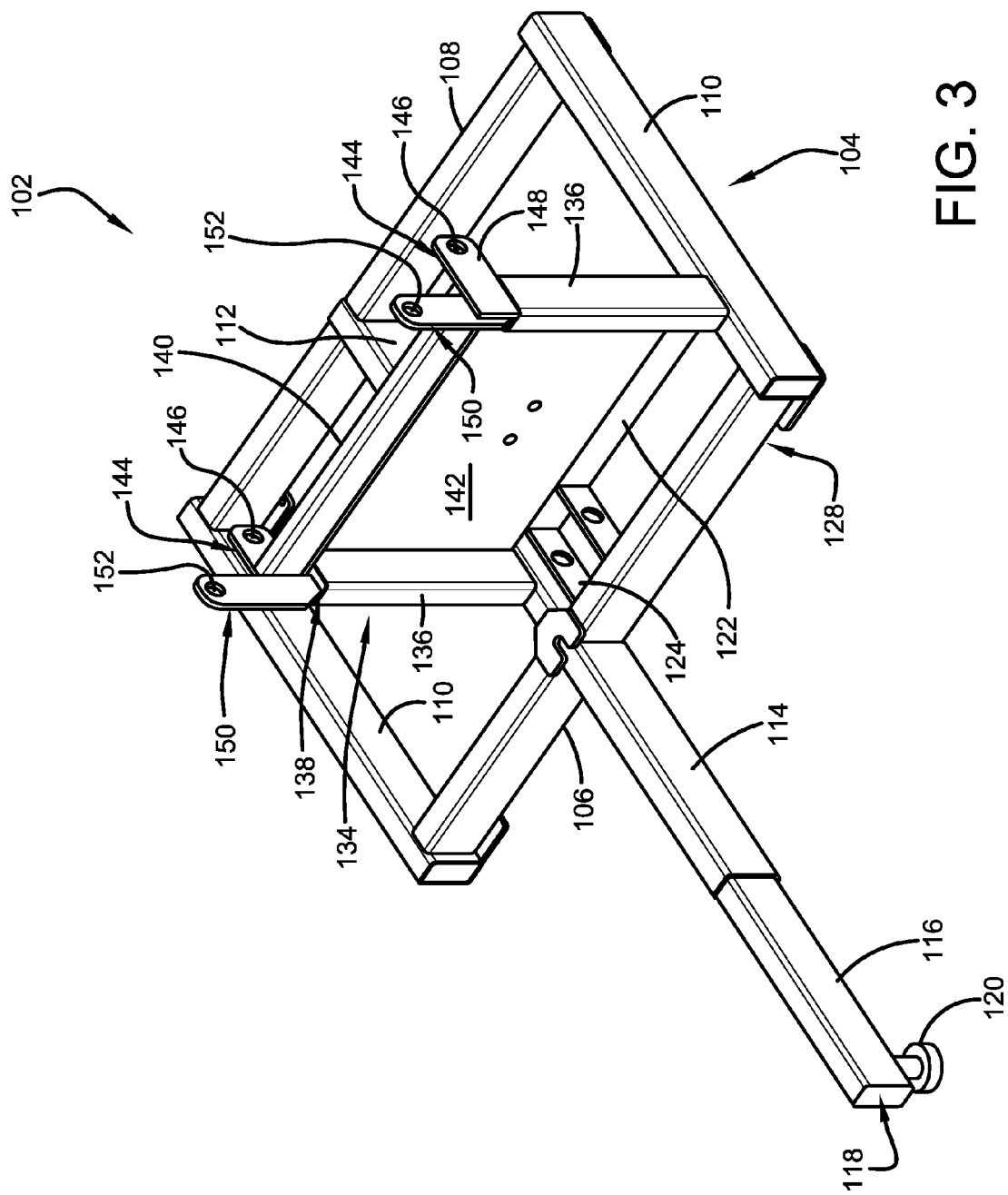
FIG. 3 illustrates a perspective view of a base assembly of the apparatus in accordance with the disclosed architecture.

Referring initially to the drawings, FIGS. 1 and 2 illustrate an apparatus 100 for repositioning and moving a grand piano without the need for manual lifting or repositioning. The apparatus 100 comprises a base assembly 102, a cradle assembly 158, and a repositioning assembly 188. As further illustrated in FIG. 3, the base assembly 102 comprises a base frame 104 and a vertical frame 134. The base frame 104 comprises a first frame rail 106, a second frame rail 108 approximately parallel to the first frame rail 106, and a pair of outside frame legs 110 connecting the first and second frame rails 106, 108 in an essentially rectangular configuration. The base assembly components are typically manufactured from sections of hollow metal tubing, channels, bars, panels or the like. However this is not meant as a limitation as any similar material or configuration as is known in the art, such as but not limited to plastic or composite materials in any geometric configuration may be used as well.

The base frame 104 further comprises an inside frame leg 112 that connects the first and second frame rails 106, 108 but is located at a position between the pair of outer frame legs 110. The inside frame leg 112 is at least as long as the pair of outer frame legs 110 and typically extends beyond the second frame rail 108. The inside frame leg 112 may comprise a plurality of extension members 114 to increase a length of the inside frame leg for additional stability as desired. The plurality of extension members 114 may be detachable from the inside frame leg 112. The inside frame leg 112 may further comprise a foot member 120 attached to a furthest end 118 of a last of the plurality of extension members 116 that may be used to brace the inside frame leg 112 against a floor.

The base frame 104 further comprises a cylinder support rail 122, a cylinder bracket 124, and a plurality of casters 126. The base assembly 102 further comprises a piston 130. The piston 130 may comprise double center balance valves. The cylinder support rail 122 runs between the inside frame leg 112 and one of the pair of outer frame legs 110. The cylinder bracket 124 is attached to the cylinder support rail 122 and the first frame rail 106 for connecting the piston 130 to the base frame 104. Each of the plurality of castors 126 are attached to an underside 128 of the base frame 104 at a plurality of positions, thereby allowing the base frame 104 to roll along a surface. The apparatus 100 may also further comprise a reservoir (not shown) in fluid communication with the piston 130 for storing hydraulic fluid, a motor (not shown) for powering the piston 130, and a controller (not shown) for directing the motor. However, this is not meant as a limitation as the piston 130 may be operated by air, gas, or electricity as well.

The vertical frame 134 comprises a pair of vertical frame rails 136, a vertical cross frame rail 140, and a mounting panel 142. Each of the pair of vertical frame rails 136 extends approximately perpendicularly up from one of the outside frame legs 110 and from the inside frame leg 112 of the base frame 104 respectively. The vertical cross frame rail 140 connects a top 138 of each of the pair of vertical frame rails 136. The mounting panel 142 is attached to the pair of vertical frame rails 136, the vertical cross frame rail 140, and the cylinder support rail 122 of the base frame 104.

The vertical frame 134 further comprises a pair of horizontal pivot members 144 and a pair of vertical pivot members 150. The pair of horizontal pivot members 144 each extends approximately horizontally back toward the first frame rail 106 from the top 138 of each of the pair of vertical frame rails 136. Each of the horizontal pivot members 144 comprise a horizontal pivot hole 146 located on each of the horizontal pivot members 144 distal to the vertical frame rails 136. The vertical frame 134 may further comprise a pair of horizontal swing arms 154 approximately configured in the same dimensions as the horizontal pivot members 144 that are located approximately adjacent to and in line with an outside edge 148 of the horizontal pivot members 144. Each of the pair of horizontal swing arms 154 are moveably connected to one of the horizontal pivot members 144 via a mechanical fastener, pin, bearing, or the like at the horizontal pivot holes 146. Each of the pair of vertical pivot members 150 extends approximately vertically up from the top 138 of the pair of frame rails 136. Each of the pair of vertical pivot members 150 comprises a vertical pivot hole 152 distal to the vertical frame rails 136.

Figure 4:
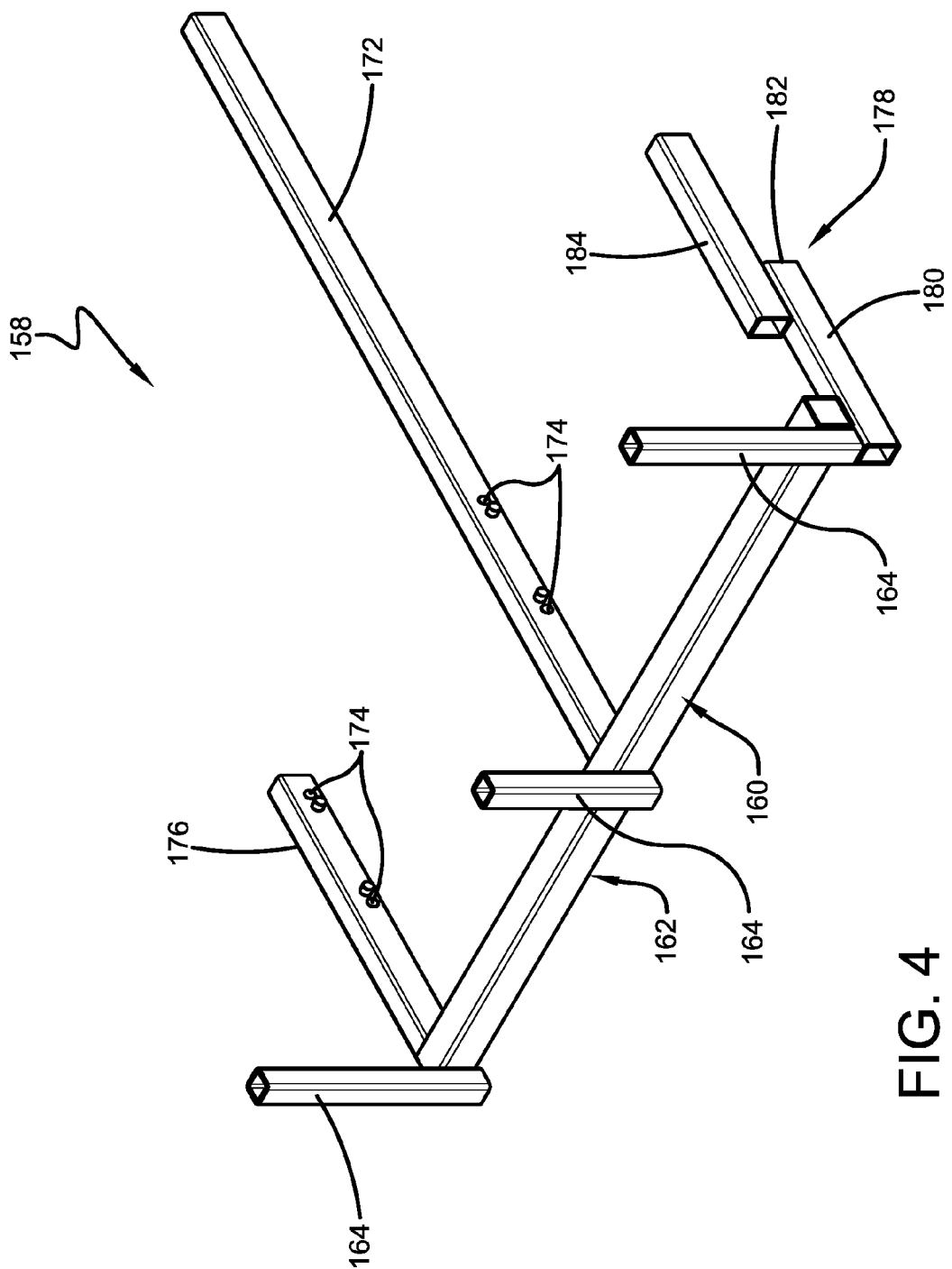
FIG. 4 illustrates a perspective view of a cradle assembly of the apparatus in accordance with the disclosed architecture.

As illustrated in FIG. 4, the cradle assembly 158 comprises a cradle beam member 160 and a plurality of skid board posts 164. The cradle assembly 158 may be detachable from the base assembly 102. The cradle beam member 160 is aligned approximately parallel with the first frame rail 106 of the base frame 104. The plurality of skid board posts 164 are attached to the cradle beam member 160 and extend approximately perpendicularly upward. The cradle assembly 158 further comprises a center support arm 172, a first support arm 176, and a second support arm 178. The center support arm 172, the first support arm 176, and the second support arm 178 each are attached to the cradle beam member 160 and extend approximately perpendicularly from the cradle beam member 160 aligned at an approximately 90 degree angle to the plurality of skid board posts 164. In other words, if the cradle beam member 160 was oriented along a z-axis and the plurality of skid board posts 164 were oriented along a y-axis, the center support arm 172, the first support arm 176, and the second support arm 178 would be oriented along an x-axis.

The center support arm 172 extends from the cradle beam member 160 substantially parallel with the inside frame leg 112 of the base frame 104. The first support arm 176 extends from the cradle beam member 160 substantially parallel with one of the pair of outside frame legs 110 of the base frame 104. Both the center support arm 172 and the first support arm 176 comprise a plurality of arm attachment points 174 for connecting to the repositioning assembly 188 as discussed infra. The second support arm 178 extends from the cradle beam member 160 substantially parallel with the other one of the pair of outside frame legs 110 of the base frame 104. The second support arm 178 may comprise a first portion 180 attached to an underside 162 of the cradle beam member 160 and a second portion 184 attached to a distal end 182 of the first portion 180. This creates a depressed portion in the second support arm 178 for accommodating a wing nut that may be present on the underside of the piano. The cradle assembly 158 may further comprise a plurality of adjustable pads (not shown) attached to the support arms 172, 176 and 178 to engage the piano as desired.

Figure 5:
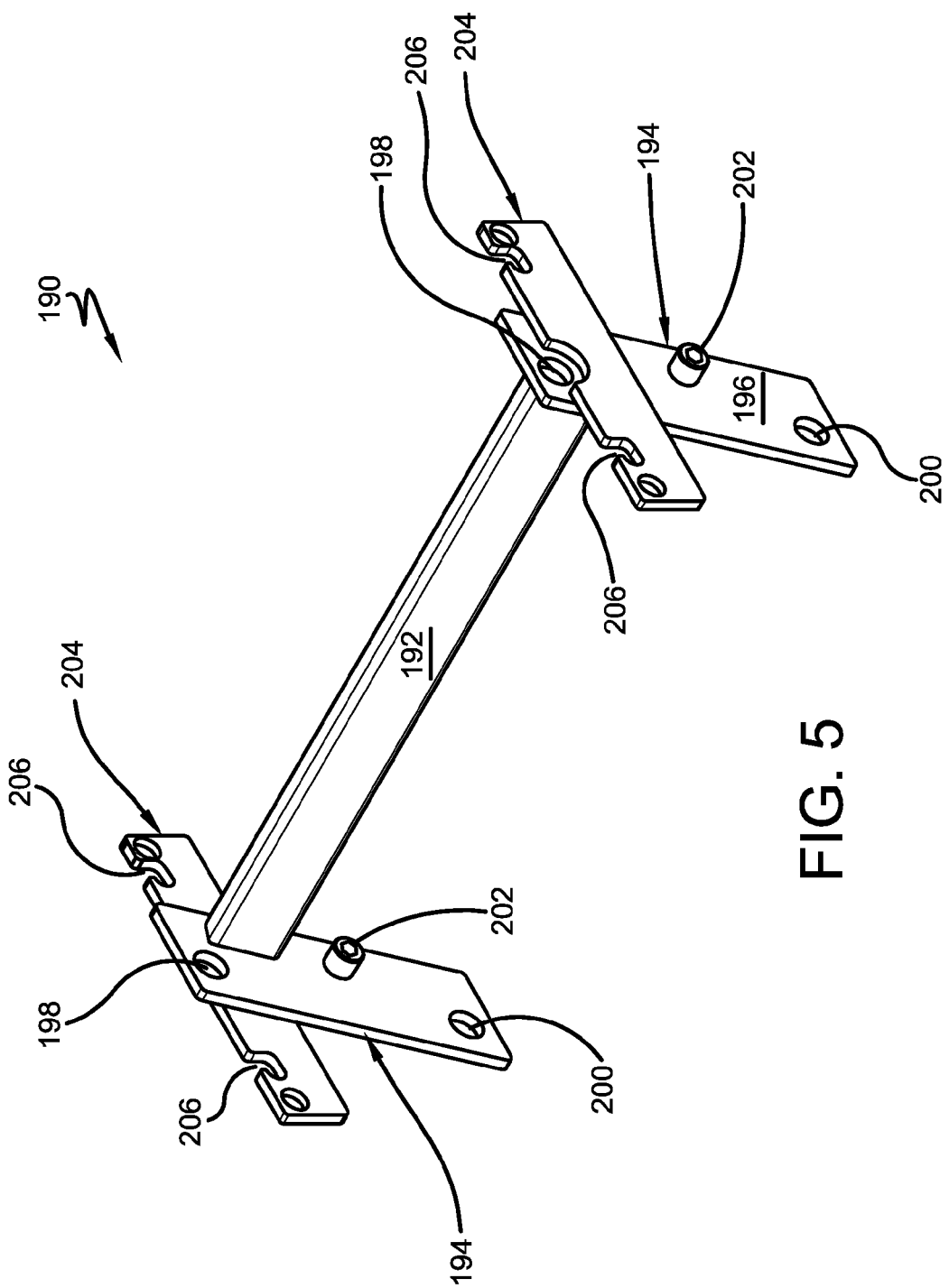
FIG. 5 illustrates a perspective view of a cylinder top beam positioning element of a repositioning assembly of the apparatus in accordance with the disclosed architecture.

As illustrated in FIG. 5, the repositioning assembly 188 comprises a cylinder top beam positioning element 190, a cylinder top beam 208, and a torque tube element 218. The cylinder top beam positioning element 190 comprises a cradle mount cross member 192, a pair of cradle mount plates 194, and a pair of cradle support bars 204. The cradle mount cross member 192 typically runs between the pair of cradle mount plates 194 at a slight backward angle. The pair of cradle support bars 204 are attached to an outside 196 of the pair of cradle mount plates 194. The pair of cradle support bars 204 each comprise a plurality of attachment points 206 for attaching the pair of cradle support bars 204 to the plurality of attachment points 174 of the center and first support arms 172, 176 of the cradle assembly 158. The pair of cradle mount plates 194 comprises a pair of top holes 198, a pair of bottom holes 200, and a pair of cradle mount pins 202 located in between the pairs of top and bottom holes 198, 200. Each of the horizontal swing arms 154 from the vertical frame 134 of the base assembly 102 are rotatably attached to one of the pair of cradle mount pins 202.

Figure 6:
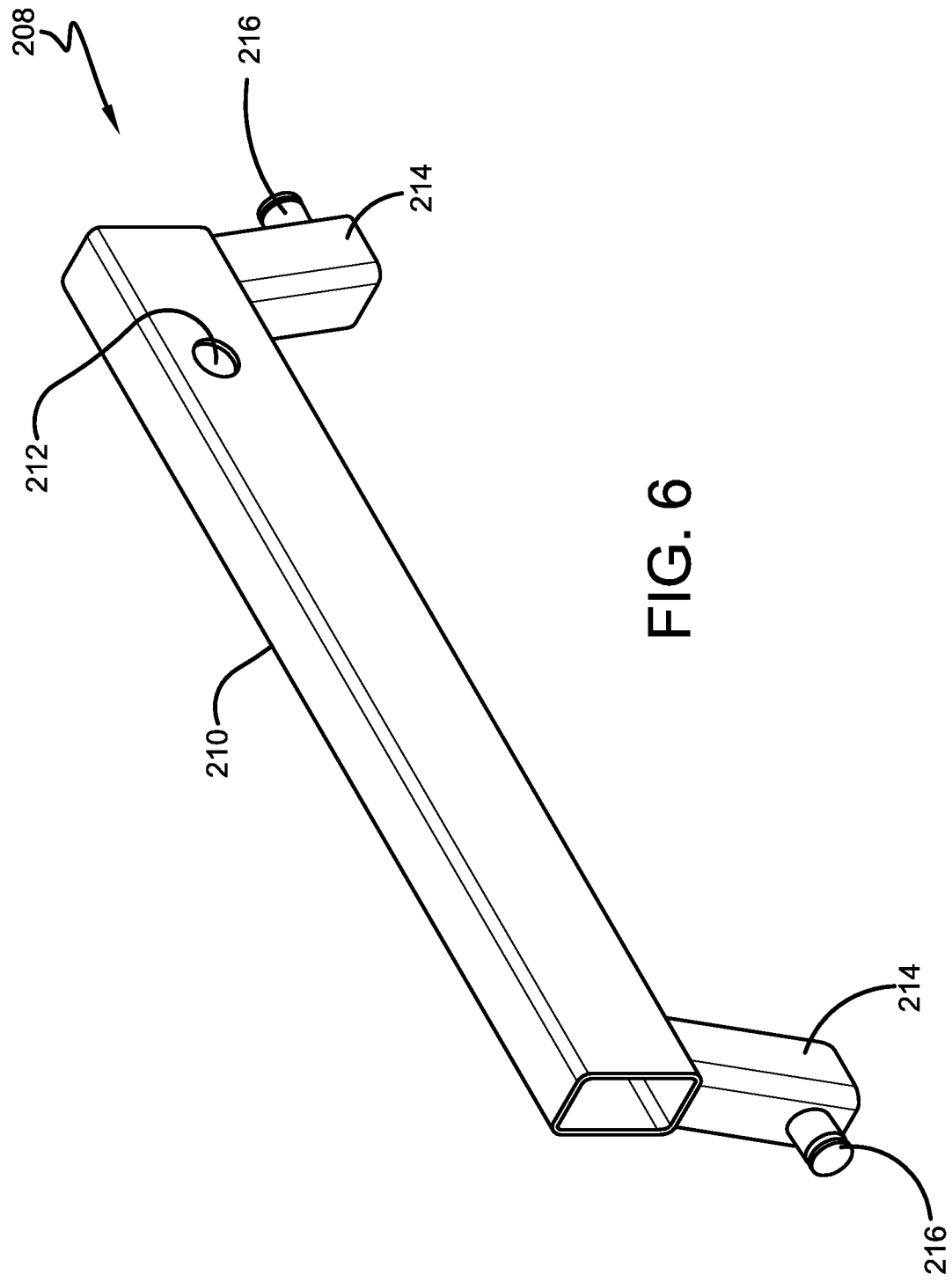
FIG. 6 illustrates a perspective view of a cylinder top beam of the repositioning assembly of the apparatus in accordance with the disclosed architecture.

As illustrated in FIG. 6, the cylinder top beam 208 comprises a beam portion 210 and a pair of top beam arms 214. The beam portion 210 comprises a piston arm attachment point 212. The piston 30 comprises a piston arm 132 that attaches to the piston attachment point 212. The top beam arms 214 are angled outward and comprise a pair of top beam pins 216. The top beam pins 216 extend laterally out of the top beam arms 214 and rotatably connect to the pair of bottom holes 200 of the cradle mount plate 194.

Figure 7:
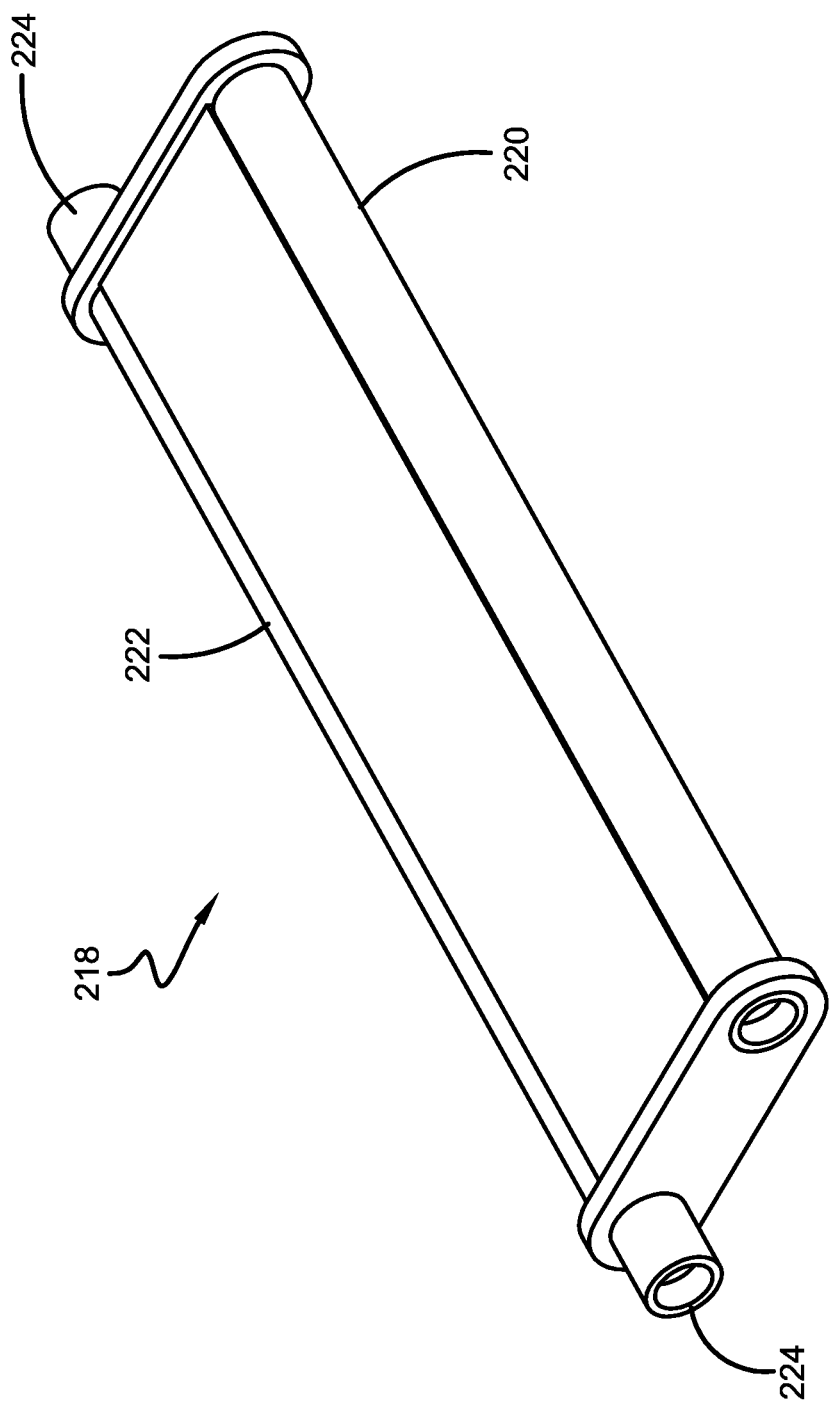
FIG. 7 illustrates a perspective view of a torque tube assembly of the repositioning assembly of the apparatus in accordance with the disclosed architecture.

As illustrated in FIG. 7, the torque tube element 218 comprises a short torque tube 220, a long torque tube 222, and a pair of torque tube ends 224 for connecting the short and long torque tubes 220, 222. The short torque tube 220 rotatably connects to the pair of vertical pivot holes 152 of the pair of vertical pivot members 150 of the vertical frame 134 of the base assembly 102. The long torque tube 222 rotatably connects the pair of top holes 198 of the pair of cradle mount plates 194 of the cylinder top beam positioning element 190.

To reposition the piano, that apparatus 100 moves between a first position where the cradle assembly 158 is substantially horizontal or parallel with the base frame 104, and a second position where the cradle assembly 158 rotates upward approximately 90 degrees. To use the apparatus 100, a user rolls the base assembly 102 under the piano from the front or keyboard side. Once positioned, the plurality of extension members 114 of the inside frame leg 112 are extended, and the foot member 120 is deployed to contact the floor. Proper position of the cradle assembly 158 comprises the center 172, first and second support arms 176, 178 contacting the underside of the piano. The piston 130 is then activated to extend the piston arm 132 pushing the cylinder top beam 208 upward. As the cylinder top beam 208 is pushed upward, the torque tubes 220, 222 and pair of horizontal swing arms 154 rotate the cradle assembly 158 to the second position. As the apparatus 100 is moved to the second position, the piano tilts vertically along with the cradle assembly 158. Once in the second position, the foot member 120 may be retracted, and the apparatus 100 and piano may be rolled in concert via the plurality of casters 126. The apparatus 100 may further comprise a plurality of straps (not shown) for further securing the piano to the apparatus 100. Once repositioned, the piston arm 132 is retracted and the apparatus 100 is returned to the first position.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An apparatus for repositioning a piano between a first position and a second position comprising:
 a base assembly comprising:
  a base frame comprising a first frame rail, a second frame rail, and a pair of outside frame legs connecting the first and the second frame rails in a rectangular configuration, and an inside frame leg connecting the first and the second frame rails;
  a piston attached to the base frame; and
  a vertical frame extending approximately perpendicularly upward from the base frame, the vertical frame comprising a pair of vertical frame rails extending perpendicularly upward from the inside frame leg and one of the outside frame legs, and a vertical cross frame rail connecting the pair of vertical frame rails; and a cradle assembly for receiving a piano; and a repositioning assembly comprising:
- a cylinder top beam positioning element pivotally connected to the vertical frame and fixedly attached to the cradle assembly;
- a cylinder top beam attached to the cylinder top beam positioning element and the piston; and
- a torque tube element moveably connecting the cylinder top beam positioning element to the vertical frame.

2. The apparatus of claim 1, wherein the vertical frame further comprises a pair of horizontal pivot members extending horizontally from a top of the pair of vertical frame rails.

3. The apparatus of claim 2, wherein the vertical frame further comprises a pair of vertical pivot members extending upward from the top of the pair of vertical frame rails.

4. The apparatus of claim 3, wherein the vertical frame further comprises a pair of horizontal swing arms moveably attached to the horizontal pivot members and to the cylinder top beam positioning element.

5. The apparatus of claim 4, wherein the base frame further comprises a plurality of castors attached to an underside of the base frame.

6. An apparatus for repositioning a piano between a first position and a second position comprising:

a base assembly comprising:
- a base frame comprising a first frame rail, a second frame rail, and a pair of outside frame legs connecting the first and the second frame rails in a rectangular configuration, and an inside frame leg connecting the first and the second frame rails;
- a piston attached to the base frame; and
- a vertical frame extending approximately perpendicularly upward from the base frame, the vertical frame comprising a pair of vertical frame rails extending perpendicularly upward from the inside frame leg and one of the outside frame legs, and a vertical cross frame rail connecting the pair of vertical frame rails; and a cradle assembly for receiving a piano the cradle assembly comprising
- a cradle beam member;
- a plurality of skid board posts extending upward from the cradle beam member;
- a first support arm extending from the cradle beam member perpendicular to the plurality of skid board posts;
- a second support arm extending from the cradle beam member perpendicular to the plurality of skid board posts;
- a center support arm extending from the cradle beam member perpendicular to the plurality of skid board posts located between the first and the second support arms; and a repositioning assembly comprising:
- a cylinder top beam positioning element pivotally connected to the vertical frame and fixedly attached to the cradle assembly;
- a cylinder top beam attached to the cylinder top beam positioning element and the piston; and
- a torque tube element moveably connecting the cylinder top beam positioning element to the vertical frame.

7. The apparatus of claim 6, wherein the vertical frame further comprises a pair of horizontal pivot members extending horizontally from a top of the pair of vertical frame rails, and a pair of vertical pivot members extending upward from the top of the pair of vertical frame rails.

8. The apparatus of claim 7, wherein the vertical frame further comprises a pair of horizontal swing arms moveably attached to the horizontal pivot members and to the cylinder top beam positioning element.

9. The apparatus of claim 8, wherein the torque tube element comprises a short torque tube rotatably connecting the pair of vertical pivot members and a long torque tube rotatably attached to the top beam positioning element.

10. The apparatus of claim 9, further comprising a reservoir in fluid communication with the piston, a motor, and a controller in electrical communication with the motor.

* * * * *